US009039021B2

(12) United States Patent
Bauer

(10) Patent No.: US 9,039,021 B2
(45) Date of Patent: May 26, 2015

(54) CONTROL ARRANGEMENT FOR A HYDROPNEUMATIC SUSPENSION SYSTEM AND HYDROPNEUMATIC SUSPENSION SYSTEM COMPRISING SUCH A CONTROL ARRANGEMENT

(71) Applicant: FSP Fluid Systems Partners Holding AG, Baar (CH)

(72) Inventor: Wolfgang Bauer, Weinheim (DE)

(73) Assignee: FSP Fluid Systems Partners Holding AG, Baar (CH)

( * ) Notice: Subject to any disclaimer, the term of this patent is extended or adjusted under 35 U.S.C. 154(b) by 0 days.

(21) Appl. No.: 13/936,263

(22) Filed: Jul. 8, 2013

(65) Prior Publication Data

US 2014/0015215 A1    Jan. 16, 2014

(30) Foreign Application Priority Data

Jul. 10, 2012  (DE) .......................... 10 2012 106 185

(51) Int. Cl.
*B60G 17/08* (2006.01)
*B60G 17/04* (2006.01)
*B60G 17/056* (2006.01)

(52) U.S. Cl.
CPC ............... *B60G 17/08* (2013.01); *B60G 17/04* (2013.01); *B60G 17/0408* (2013.01); *B60G 17/056* (2013.01); *B60G 2500/02* (2013.01)

(58) Field of Classification Search
CPC .. B60G 17/0155; B60G 17/056; B60G 17/08; B60G 17/04; B60G 17/0408; B60G 2500/02
USPC ...................... 280/124.159, 124.16, 124.157, 280/124.104, 5.513
See application file for complete search history.

(56) References Cited

U.S. PATENT DOCUMENTS 5,338,010 A    8/1994  Haupt
6,145,859 A    11/2000 Altherr et al.
(Continued)

FOREIGN PATENT DOCUMENTS

DE    41 20 758    1/1992
DE    42 42 448    3/1994
(Continued)

OTHER PUBLICATIONS

Walter Brandenburger, Hydropneumatic vehicle suspension, Nov. 12, 1998, EPO, DE 197 19 077 A1, Machine Translation of Description.*

*Primary Examiner* — James English
(74) *Attorney, Agent, or Firm* — Lipsitz & McAllister, LLC

(57) ABSTRACT

A control arrangement for a hydropneumatic suspension system and a hydropneumatic suspension system are provided. The control arrangement has a pressure supply connection, a return connection, a piston chamber connection adapted to be connected to the piston chamber of a suspension cylinder of the hydropneumatic suspension system, an annular chamber connection adapted to be connected to the annular chamber of the suspension cylinder, and at least one controllable valve arrangement comprising a plurality of switch positions via which the pressure supply connection and the return connection are connectable to the piston chamber connection and the annular chamber connection. The annular chamber connection is in flow connection with the return connection via a pressure-limiting line having a hydraulically controllable pressure-limiting element. The pressure-limiting element has a control input adapted to be acted upon via a control line by a control pressure which is limitable to a predefinable pressure limit.

10 Claims, 3 Drawing Sheets

(56) References Cited

U.S. PATENT DOCUMENTS

| | | | |
|---|---|---|---|
| 6,394,238 B1 * | 5/2002 | Rogala | 188/266.2 |
| 6,405,750 B1 * | 6/2002 | Rogala | 137/493.8 |
| 6,578,855 B2 | 6/2003 | Wallestad | |
| 6,644,096 B2 | 11/2003 | Brandenburger | |
| 6,786,492 B2 | 9/2004 | Brandenburger | |
| 6,988,363 B2 * | 1/2006 | Bitter | 60/468 |
| 7,048,280 B2 | 5/2006 | Brandenburger | |
| 7,059,127 B2 | 6/2006 | Bauer et al. | |
| 7,073,803 B2 | 7/2006 | Huth | |
| 7,140,178 B2 * | 11/2006 | Bitter | 60/413 |
| 7,219,779 B2 * | 5/2007 | Bauer et al. | 188/266 |
| 7,337,610 B2 * | 3/2008 | Bitter et al. | 60/469 |
| 7,516,614 B2 * | 4/2009 | Bitter | 60/469 |
| 7,766,343 B2 * | 8/2010 | Bauer | 280/5.5 |
| 8,096,568 B2 * | 1/2012 | Huth | 280/124.16 |
| 2002/0109400 A1 | 8/2002 | Huth | |
| 2002/0157451 A1 | 10/2002 | Brandenburger | |
| 2002/0171209 A1 | 11/2002 | Brandenburger | |
| 2004/0217566 A1 | 11/2004 | Huth | |
| 2005/0050886 A1 | 3/2005 | Bauer et al. | |
| 2005/0258607 A1 | 11/2005 | Brandenburger | |
| 2009/0051130 A1 | 2/2009 | Huth | |
| 2012/0324767 A1 * | 12/2012 | Ault et al. | 37/305 |

FOREIGN PATENT DOCUMENTS

| | | |
|---|---|---|
| DE | 43 08 460 | 9/1994 |
| DE | 197 19 076 | 11/1998 |
| DE | 197 19 077 | 11/1998 |
| DE | 197 48 224 | 5/1999 |
| DE | 101 06 706 | 9/2002 |
| DE | 101 07 631 | 9/2002 |
| DE | 101 07 644 | 9/2002 |
| DE | 102 32 769 | 2/2004 |
| DE | 103 37 600 | 3/2005 |
| DE | 10 2004 040 636 | 2/2006 |

* cited by examiner

FIG.1

CONTROL ARRANGEMENT FOR A HYDROPNEUMATIC SUSPENSION SYSTEM AND HYDROPNEUMATIC SUSPENSION SYSTEM COMPRISING SUCH A CONTROL ARRANGEMENT

This application claims the benefit of German application number 10 2012 106 185.8 filed Jul. 10, 2012, which is incorporated herein by reference in its entirety and for all purposes.

BACKGROUND OF THE INVENTION

The invention relates to a control arrangement for a hydropneumatic suspension system, in particular for vehicles, the control arrangement having a pressure supply connection for connecting to a pressure supply, a return connection, a piston chamber connection adapted to be connected to a piston chamber of a suspension cylinder of the hydropneumatic suspension system and adapted to be acted upon by a piston chamber pressure, an annular chamber connection adapted to be connected to the annular chamber of the suspension cylinder and adapted to be acted upon by an annular chamber pressure, and at least one controllable valve arrangement which comprises a plurality of switch positions through which the pressure supply connection and the return connection are connectable to the piston chamber connection and the annular chamber connection, the annular chamber connection being in flow connection with the return connection via a first pressure-limiting line, and a hydraulically controllable pressure-limiting element being provided in the first pressure-limiting line, said pressure-limiting element comprising a control input adapted to be acted upon via a control line by a control pressure that corresponds to the piston chamber pressure.

Moreover, the invention relates to a hydropneumatic suspension system comprising such a control arrangement.

Hydropneumatic suspension systems are in particular used in vehicles with varying load conditions, for example in tractors having holding means for attachments. At least one suspension cylinder is disposed between sprung and unsprung masses of the vehicle. Said cylinder comprises a piston chamber that is connected to a first hydraulic accumulator and can be acted upon by pressurized hydraulic fluid, and that carries the suspension load. The at least one suspension cylinder often comprises in addition an annular chamber that sealingly surrounds the piston rod of the suspension cylinder.

With increasing suspension load, hydraulic fluid is pushed out of the piston chamber into the first hydraulic accumulator so that the relative position of the sprung and unsprung masses changes. The change in the relative position is detected by sensors that are connected to an electrical control unit. The electrical control unit controls at least one valve arrangement such that the valve arrangement changes its switch position and connects the piston chamber to the pressure supply connection so that hydraulic fluid is fed to the piston chamber until a predefinable relative position is reached again. With decreasing suspension load, hydraulic fluid flows out of the first hydraulic accumulator into the piston chamber so that the relative position of the sprung and unsprung masses changes again. The change in the relative position is detected again so that the valve arrangement changes again its switch position and connects the piston chamber to the return connection. Then, hydraulic fluid can flow out of the piston chamber until the predefined level is established again.

Such suspension systems are in particular used in front axle suspensions of agricultural tractors. During work using a mounted tractor plow, the rear axle of the tractor is greatly loaded and the front axle is greatly relieved. Reversed conditions occur during work using a front loader. Thus, agricultural tractors are operated under very different operating conditions with very different front axle loads. It is known to those skilled in the art that hydropneumatic suspension systems have the property to stiffen disproportionately with increasing load. This is not always of benefit to the suspension properties. Thus, it is often attempted to counteract this property by preloading the suspension. In addition, preloading has the advantage that the operating range of the hydraulic accumulator is not exceeded even in the case of a greatly varying suspension load.

For preloading, in addition to the piston chamber, the annular chamber also of the at least one suspension cylinder is often acted upon by pressurized hydraulic fluid, the annular chamber being connected to a second hydraulic accumulator. In this connection, suspension systems are known in which the annular chamber is acted upon by a constant pressure and, as a result, the suspension is subjected to a constant preload. However, it is often useful, in particular in the case of low front axle loads, to increase the preload, thereby hardening the suspension. The reason for this is that low front axle loads of tractors are caused by heavy attachments at the rear, for example by a heavy mounted tractor plow, which also greatly increase the moment of inertia about the transverse axis of the tractor. This results in strong oscillations about the transverse axis of the tractor when driving over uneven ground. These oscillations are usually designated as "pitching oscillations". These pitching oscillations can cause the suspension to bottom out. In the case of a constant preload, the latter has to be selected high enough that bottoming out cannot occur, not even under low axle loads. However, this has the disadvantage that the suspension of an unloaded tractor is very hard and therefore offers only limited driving comfort.

Suspension systems having a variable annular chamber pressure are also known. They avoid the aforementioned disadvantage by setting a high annular chamber pressure for the tractor with a heavy rear-mount attachment and a low front axle load and thus harden the suspension, whereas for an empty tractor with a medium front axle load, they set a low annular chamber pressure and thus preload the suspension to a lower extent and therefore make it softer. Suspension systems with variable annular chamber pressure thus enable improved driving comfort. Such suspension systems are described in U.S. Pat. No. 6,578,855 B2. In this publication, it is proposed to control the annular chamber pressure in inverse proportion to the piston chamber pressure so that the higher the piston chamber pressure, the lower is the annular chamber pressure. At very high piston chamber pressures, the annular chamber pressure is therefore very low. This affects adversely not only the suspension properties of the suspension system but also the hydraulic accumulator connected to the annular chamber.

In DE 197 19 076 A1, a control arrangement of the aforementioned kind is disclosed. In this control arrangement, the annular chamber is connected to the reservoir of the hydropneumatic suspension system via a pressure-limiting line, and provided in the pressure-limiting line is a three-way pressure control valve, the control spring of which is supported on a positioning piston. The positioning piston is configured as a stepped piston that is displaceable in a housing. On the one side, said piston can be acted upon by the spring force of a positioning spring, and on the other side, it can be acted upon by a control pressure that corresponds to the pressure prevailing in the piston chamber. By means of an adjustable end stop, the movability of the positioning piston is limited. Such a configuration of the control arrangement offers the possibility to control the annular chamber pressure in inverse proportion to the piston chamber pressure only at relatively low piston chamber pressures, whereas at high piston chamber pressures, the annular chamber pressure assumes a constant value, since under such pressure conditions, the positioning piston comes into engagement on the end stop and therefore, the annular chamber pressure cannot be further reduced by the pressure control valve. Such a behavior is of advantage for the suspension properties of the suspension system. However, disadvantageous are the high component costs and the complex control as well as the vulnerability to failure of such control arrangements for which no standard components can be used, so that producing such control arrangements is associated with significant costs.

It is therefore an object of the present invention to provide a control arrangement and a hydropneumatic suspension system comprising a control arrangement of this kind which enable variable annular chamber pressure adjustment with as little effort, complexity and production costs as possible while using standard components.

SUMMARY OF THE INVENTION

This object is achieved with a control arrangement of the generic kind in that the control pressure is limitable to a predefinable pressure limit.

Adjusting the annular chamber pressure in the control arrangement according to the invention is carried out in dependence on the pressure prevailing in the piston chamber. If the pressure prevailing in the piston chamber is greater than a specific piston chamber pressure limit, which advantageously is adjustable, the pressure prevailing in the annular chamber is adjusted to a virtually constant value. If the piston chamber pressure falls below the piston chamber pressure limit, then, the farther the piston chamber pressure falls below the piston chamber pressure limit, the higher the annular chamber pressure is adjusted. The piston chamber pressure limit ideally corresponds to the pressure prevailing in the piston chamber at a suspension load that occurs when the tractor is not loaded. At low suspension loads, the annular chamber pressure that increases with decreasing piston chamber pressure causes an increase of the spring rate of the suspension system. In the range below the suspension load of the unloaded tractor and thus in the range of relatively low front axle loads as they occur for tractors with heavy rear-mounted attachments, the increasing spring rate counteracts potential pitching oscillations.

In the control arrangement according to the invention, the control input of the hydraulically controllable pressure-limiting element that is provided in a pressure-limiting line connecting the annular chamber connection to the return connection can be acted upon by a control pressure that corresponds to the piston chamber pressure, the control pressure being limitable to a predefined limit value. The control pressure applied to the control input of the pressure-limiting element controls the pressure-limiting element such that the higher the control pressure, the lower is the pressure that is limited. Thus, in the control arrangement according to the invention, the control pressure applied to the control input of the pressure-limiting element is limited to a predefinable limit value. At piston chamber pressures above the piston chamber pressure limit, the hydraulic control pressure that is applied to the control input of the pressure-limiting element and corresponds to the piston chamber pressure assumes only the predefinable limit value and cannot be increased further. Thus, at piston chamber pressures above the piston chamber pressure limit, the annular chamber pressure also assumes a constant value. At piston chamber pressures below the piston chamber pressure limit, the control pressure applied to the control input of the pressure-limiting element follows the behavior of the piston chamber pressure, i.e., the control pressure is identical or at least proportional to the piston chamber pressure. The farther the piston chamber pressure falls below the piston chamber pressure limit, the lower also is the control pressure that is applied to the control input of the pressure-limiting element. Thus, at piston chamber pressures below the piston chamber pressure limit, the consequence of this is that the farther the piston chamber pressure falls below the piston chamber pressure limit, the higher the values that the annular chamber pressure assumes.

The hydraulically controllable pressure-limiting element is preferably configured as a hydraulically controllable pressure-limiting valve. Alternatively, it can be provided that the pressure-limiting element is formed as a hydraulically controllable pressure control valve. The hydraulically controllable pressure-limiting valve has a control input to which a control pressure is applied. The control pressure acts as a load on the spring of the pressure-limiting valve. Such valves are known to those skilled in the art under the designation "lowering brake valve".

It is particularly advantageous if the restoring force of the spring of the hydraulically controllable pressure-limiting element is adjustable.

It is an advantage if the piston chamber connection is in flow connection with the control input of the hydraulically controllable pressure-limiting element via the control line, the flow rate of the hydraulic fluid flowing through the control line being limitable. Thus, the outflow of hydraulic fluid from the piston chamber connection to the control input of the hydraulically controllable pressure-limiting element can be limited.

In an advantageous embodiment, a flow resistance, for example a throttle or orifice, is provided in the control line. By using a flow resistance, the volume flow flowing off via the control line can be limited in a simple manner.

For limiting the control pressure to a predefinable limit value, the control line of a preferred embodiment of the control arrangement according to the invention is in flow connection with the return connection via a second pressure-limiting line, a further pressure-limiting element being provided in the line, the second pressure-limiting line. Thus, the hydraulically controllable pressure-limiting element provided in the pressure-limiting line is associated with a further pressure-limiting element that is provided in a second pressure-limiting line branching off the control line. Said further pressure-limiting element enables, in a simple manner, the control pressure applied to the hydraulically controllable pressure-limiting element to be limited to a predefinable limit value.

Said further pressure-limiting element is preferably configured as a pressure-limiting valve.

Advantageously, the opening pressure of the further pressure-limiting element can be adjusted for example via a spring. Thus, by adjusting the opening pressure of the further pressure-limiting element, the limit value of the control pressure can be changed.

As an alternative to the use of a further pressure-limiting element it is provided in an advantageous embodiment of the control arrangement that the control line is in flow connection with the first pressure-limiting line via a connecting line, said connecting line ending in the first pressure-limiting line on the high pressure side of the hydraulically controllable pressure-limiting element. In such a configuration, the control pressure applied to the control input of the hydraulically controllable pressure-limiting element is limited to the pressure level prevailing in the first pressure-limiting line on the high pressure side of the pressure-limiting element. Thus, the control pressure is automatically limited to the highest annular chamber pressure. If the hydraulically controllable pressure-limiting element is provided as a hydraulically controllable pressure-limiting valve, the effective area of the control pressure and also the effective area of the pressure to be limited are acted upon by the annular chamber pressure, and the control pressure and also the annular chamber pressure act against the spring of the hydraulically controllable pressure-limiting valve.

Preferably, a check valve that opens in the direction toward the first pressure-limiting line is provided in the connecting line via which the control line is in flow connection with the first pressure-limiting line. The check valve unblocks the flow connection from the control line to the first pressure-limiting line if the pressure prevailing in the control line is higher than the pressure in the first pressure-limiting line on the high pressure side of the hydraulically controllable pressure-limiting element.

The invention also relates to a hydropneumatic suspension system in particular for vehicles. The hydropneumatic suspension system comprises a pump for generating pressure, a reservoir for hydraulic fluid and at least one suspension cylinder that has a piston chamber which carries the suspension load, is acted upon by pressure and is connected to a first hydraulic accumulator, and an annular chamber that sealingly surrounds a piston rod of the suspension cylinder, is acted upon by pressure and is connected to a second hydraulic accumulator. Moreover, the hydropneumatic suspension system comprises a control arrangement of the aforementioned kind, the piston chamber being connected to the piston chamber connection and the annular chamber being connected to the annular chamber connection. As already mentioned, such a hydropneumatic suspension system is characterized by low complexity, it being possible to keep the risk of pitching oscillations low. Moreover, the suspension system according to the invention has the advantage that it can be produced in a cost-effective manner, it being possible to use standard components with very low susceptibility to failure.

The following description of two preferred embodiments of the invention serves in connection with the drawing for a more detailed explanation.

BRIEF DESCRIPTION OF THE DRAWINGS

FIG. 1 shows a circuit diagram of a hydropneumatic suspension system with a first embodiment of a control arrangement according to the invention;

DETAILED DESCRIPTION OF THE INVENTION

Figure 1:
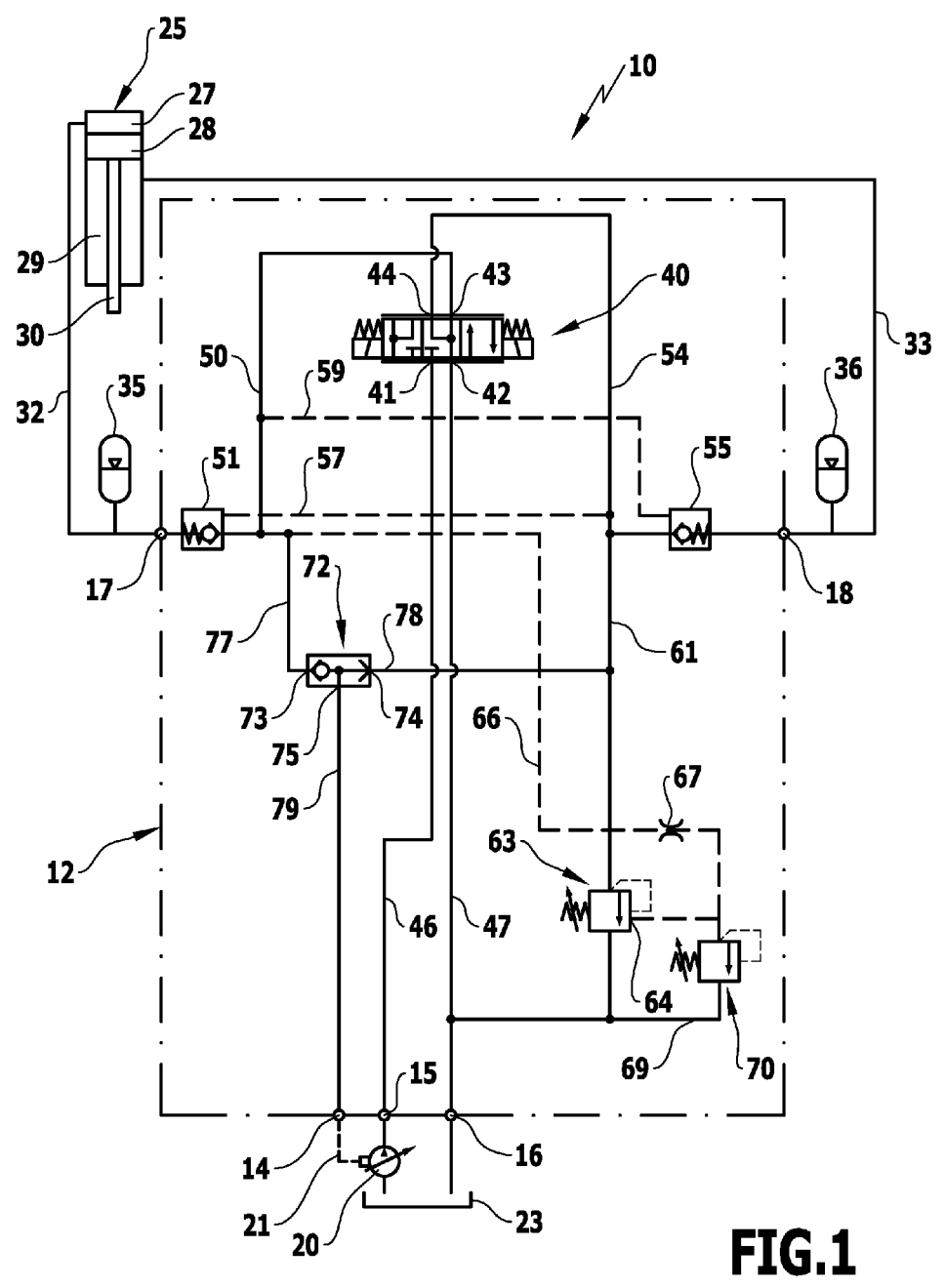
Figure 2:
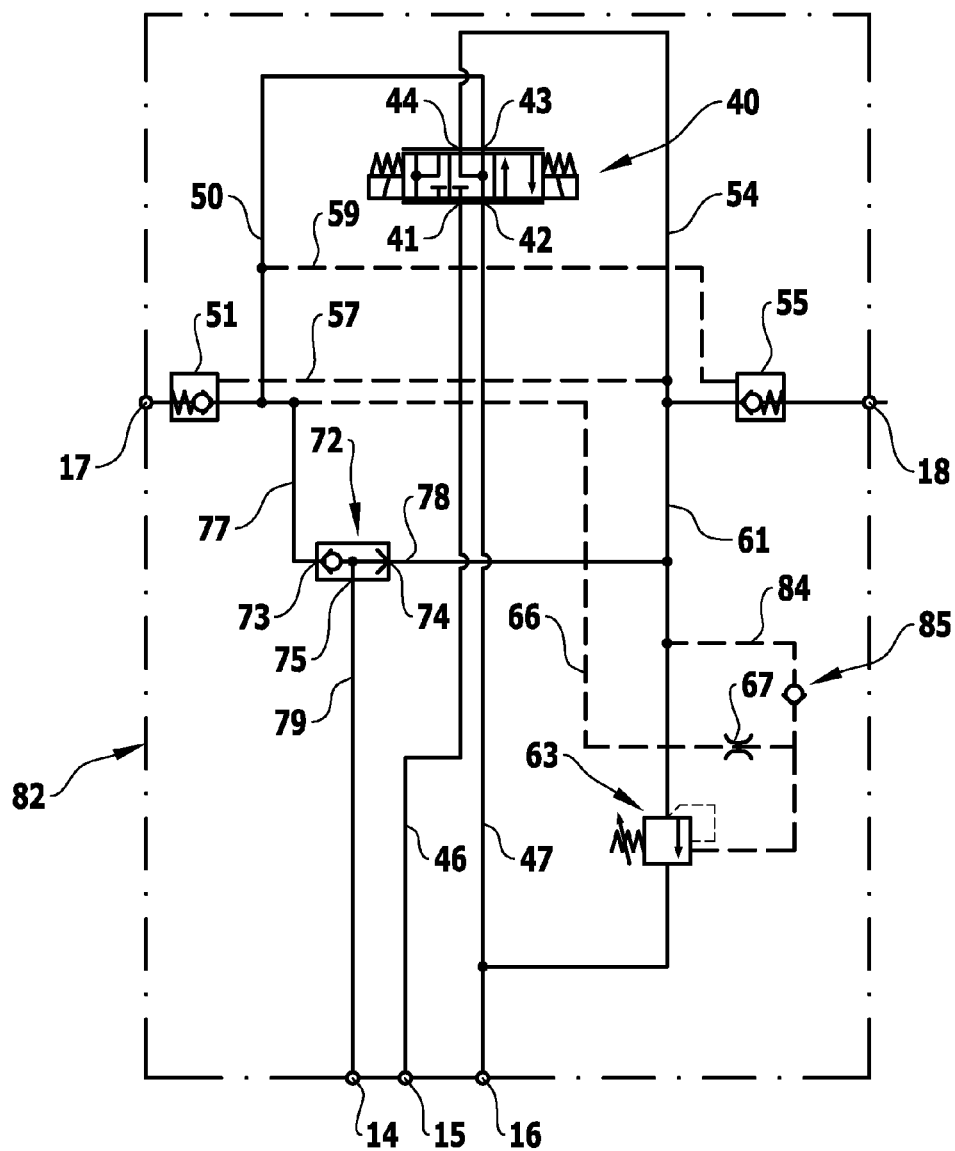
FIG. 2 shows a circuit diagram of a second embodiment of a control arrangement according to the invention adapted to be used for a hydropneumatic suspension system as illustrated in FIG. 1.

FIG. 1 illustrates schematically a hydropneumatic suspension system according to an advantageous embodiment of the invention that is designated as a whole by the reference number 10. The suspension system 10 is in particular suitable for use in vehicles with greatly varying load conditions, for example in tractors with holding means for attachments at the front and rear. In the suspension system illustrated in FIG. 1, a first embodiment of a control arrangement according to the invention is used that is designated by the reference number 12 and that has a control connection 14, a pressure supply connection 15, a return connection 16 as well as a piston chamber connection 17 and an annular chamber connection 18. Connected to the pressure supply connection 15 is a load-sensing pump 20 that is controlled via a pump control line 21 connected to the control connection 14. A reservoir 23 is connected to the return connection 16.

In addition to the control arrangement 12, the hydropneumatic suspension system in the configuration illustrated in FIG. 1 has a suspension cylinder 25 that is disposed between sprung and unsprung masses, which are not illustrated in detail, of a vehicle, preferably of a tractor. The hydropneumatic suspension system 10 can be used, for example, in a front axle suspension of a tractor that has holding means for attachments at the front and rear. The suspension cylinder 25 comprises a piston chamber 27 that is separated from an annular chamber 29 by a piston 28. The annular chamber 29 surrounds a piston rod 30.

The piston chamber 27 is connected to the piston chamber outlet 17 via a first connecting line 32, and the annular chamber 29 is connected to the annular chamber outlet 18 of the control arrangement 12 via a second connecting line 33. A first hydraulic accumulator 35 is connected to the first connecting line 32, and a second hydraulic accumulator 36 is connected to the second connecting line 33.

The control arrangement 12 has a controllable valve arrangement 40. In the illustrated embodiment, the valve arrangement 40 is provided in the form of a spring-centered and magnet-operated 4-port/3-way proportional valve and comprises a pressure port 41, and a drain port 42, as well as a first working port 43 and a second working port 44. In the normal position of the valve arrangement 40 illustrated in FIG. 1, the pressure port 41 is blocked and the two working ports 43, 44 are connected to the drain port 42. In a first working position, the first working port 43 is connected to the drain port 42 and the second working port 44 is connected to the pressure port 41. In a second working position, the two working ports 43, 44 are connected to the pressure port 41 and the drain port 42 is blocked.

The pressure port 41 is in flow connection with the pressure supply connection 15 via a pressure line 46, and the drain port 42 is in flow connection with the return connection 16 via a drain line 47. The first working port 43 is in flow connection with the piston chamber connection 17 via a first output line 50. A first releasable check valve 51 is provided in the first output line 50, between the working port 43 and the piston chamber connection 17. The second working port 44 is in flow connection with the annular chamber connection 18 via a second output line 54. A second releasable check valve 55 is provided in the second output line 54, between the working port 44 and the annular chamber connection 18. The first releasable check valve 51 opens in the direction toward the piston chamber connection 17 and can be released for a flow in the opposite direction via a first valve control line 57. The first valve control line 57 branches off the second output line 54 between the second releasable check valve 55 and the second working port 44. The second releasable check valve 55 opens in the direction toward the annular chamber connection 18 and can be released for a flow in the opposite direction via a second valve control line 59. The second valve control line 59 branches off the first output line 50 between the first releasable check valve 51 and the first working port 43.

In the region between the second working port 44 and the second releasable check valve 55, a first pressure-limiting line 61 branches off the second output line 54 and ends in the drain line 47, and it enables a flow connection between the second output line 54 and the return connection 16 via the drain line 47. A hydraulically controllable pressure-limiting element that is configured in the form of a hydraulically controllable pressure-limiting valve 63 is provided in the first pressure-limiting line 61. A control input 64 of the pressure-limiting valve 63 is in flow connection via a control line 66 with the first output line 50 from which the control line 66 branches off in the region between the first releasable check valve 51 and the first working port 43. A flow resistance in the form of a throttle element 67 is provided in the control line 66, and a second pressure-limiting line 69, in which a further pressure-limiting valve 70 is provided, branches off the control line 66 in the region between the throttle element 67 and the control input 64 and ends in the first pressure-limiting line 61 on the low pressure side of the hydraulically controllable pressure-limiting valve 63, and thus is in flow connection with the return connection 16. The opening pressure of the further pressure-limiting valve 70 is adjustable via a spring.

The control arrangement 12 comprises in addition a shuttle valve 72 with a first port 73, a second port 74 and a third port 75. The first port 73 is in flow connection via a first line 77 with the first output line 50, in which the first line 77 ends in the region between the first controllable check valve 51 and the first working port 43. The second port 74 is in flow connection via a second line 78 with the first pressure-limiting line 61, in which the second line 78 ends on the high pressure side of the hydraulically controllable pressure-limiting valve 63. The third port 75 is connected to the control connection 14 of the control arrangement 12 via a third line 79.

Starting from its normal position illustrated in FIG. 1, the valve arrangement 40 can selectively move into the first working position or into the second working position. The changeover in the illustrated exemplary embodiment takes place in dependence on the relative position of the sprung and unsprung masses of the vehicle, thus, for example, of the tractor, and is controlled by an electrical control unit that is known per se and therefore, for the sake of a better overview, is not illustrated in the drawing, and that is in electrical connection with the sensors detecting the relative position of the sprung and unsprung masses. Changing the relative position of the sprung and unsprung masses, for example due to changing the sprung masses, results in a change in the volumes of the piston chamber 27 and the annular chamber 29 so that the level position of the vehicle changes. For equilibrium, and in dependence on the switch position of the valve arrangement 40, the piston chamber 27 and the annular chamber 29 can be acted upon by pressure. However, the use of the hydraulically controllable pressure-limiting valve 63 and the further pressure-limiting valve 70 has the consequence that at piston chamber pressures above a certain piston chamber pressure limit, the annular chamber 29 is acted upon by a virtually constant pressure. The piston chamber pressure limit is adjustable by the position of the spring of the further pressure-limiting valve 70. If the piston chamber pressure prevailing in the piston chamber 27 falls below the set piston chamber pressure limit, the consequence of this is that the farther the piston chamber pressure falls below the piston chamber pressure limit, the higher the values assumed by the annular chamber pressure prevailing in the annular chamber 29.

Figure 3:
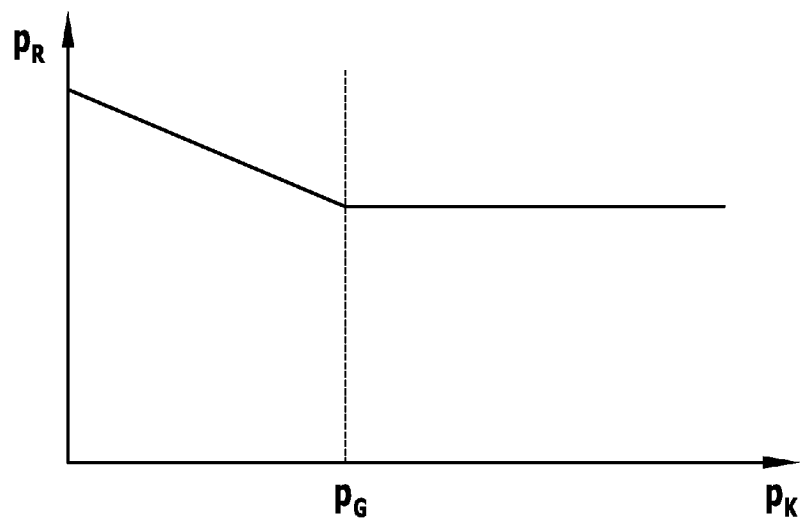
FIG. 3 shows a schematic illustration of the progression of the annular chamber pressure prevailing in an annular chamber of a suspension cylinder of the hydropneumatic suspension system of FIG. 1 as a function of the pressure prevailing in the piston chamber of the suspension cylinder.

The progression of the annular chamber pressure $p_R$ in dependence on the piston chamber pressure $p_K$ is schematically illustrated in FIG. 3. The illustrated dependence of the annular chamber pressure $p_R$ on the piston chamber pressure $p_K$ is achieved by the use of the hydraulically controllable pressure-limiting valve 63, the control input 64 of which is acted upon by the piston chamber pressure $p_K$. The piston chamber pressure prevailing at the control input 64 acts as a load on the spring of the hydraulically controllable pressure-limiting valve 63. Such valves are also known as so-called "lowering brake valves". Thus, the higher the piston chamber pressure $p_K$ applied to the control input 64, the lower is the annular chamber pressure $p_R$. However, this behavior of the annular chamber pressure $p_R$ takes place only at piston chamber pressures below the piston chamber pressure limit $p_G$, because at piston chamber pressures above the piston chamber pressure limit $p_G$, the further pressure-limiting valve 70 becomes active and limits the piston chamber pressure $p_K$ applied to the control input 64 to the piston chamber pressure limit $p_G$.

Thus, at piston chamber pressures above the piston chamber pressure limit $p_G$, a constant control pressure is applied to the control input 64 of the hydraulically controllable pressure-limiting valve 63, and the annular chamber pressure $p_R$ assumes a constant value. This is immediately apparent in FIG. 3.

As already explained, the throttle element 67 adapted to be configured, for example, in the form of an orifice, is provided in the control line 66. The use of the throttle element 67 limits the volume flow that flows out of the first output line 50 via the control line 66. Moreover, by using the throttle element 67, the flow rate requirement for the further pressure-limiting valve 70 can be kept low, and the selected overall size thereof can be small.

Figure 4:
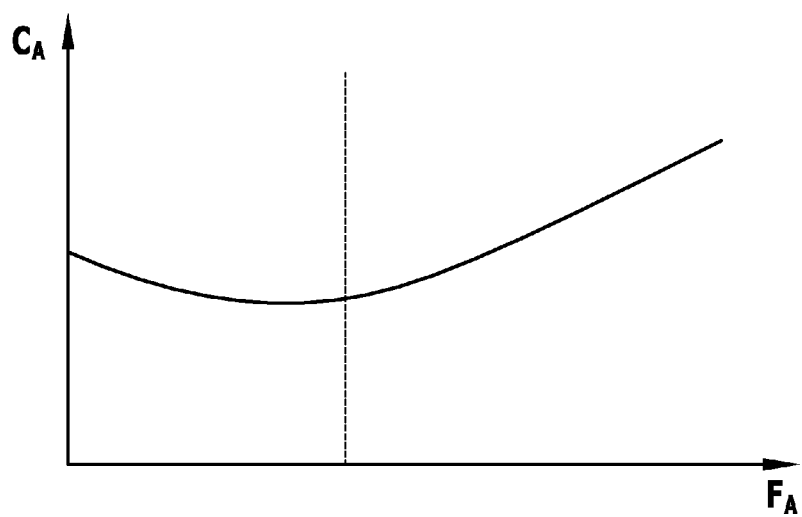
FIG. 4 shows a schematic illustration of the spring rate of the hydropneumatic suspension system of FIG. 1 as a function of the axle load of a vehicle in which the hydropneumatic suspension system is used.

FIG. 4 shows the schematically illustrated progression of the spring rate $C_A$ of the hydropneumatic suspension system 10 in dependence on the axle load $F_A$. The annular chamber pressure $p_R$ that increases with decreasing piston chamber pressure $p_K$ causes, at low suspension loads $F_A$, a spring rate $c_A$ that is higher than would be the case at a constant annular chamber pressure $p_R$. At low axle loads $F_A$, such a progression of the spring rate $c_A$ counteracts potential pitching oscillations adapted to be caused by heavy attachments at the rear of the tractor.

FIG. 2 illustrates a second embodiment of a control arrangement according to the invention which, as a whole, is designated by the reference number 82. The control arrangement 82 can be used in the hydropneumatic suspension system 10 as an alternative to the above-described control arrangement 12. The control arrangement 82 is formed to be largely identical to the control arrangement 12. For identical components, the same reference numbers as in FIG. 1 are used in FIG. 2, and in order to avoid repetition with regard to these components, reference is made to the above explanations.

The control arrangement 82 differs from the control arrangement 12 in that in the region between the throttle element 67 and the control input 64 of the hydraulically controllable pressure-limiting valve 63, a connecting line 84, in which a check valve 85 is provided, branches off the control line 66 and ends in the first pressure-limiting line 61 on the high pressure side of the controllable pressure-limiting valve 63. In the control arrangement 82 illustrated in FIG. 2, the further pressure-limiting valve 70 and the second pressure-limiting line 69 are eliminated. The check valve 85 opens in the direction of the first pressure-limiting line 61 and blocks in the opposite direction. By this, the control pressure applied to the control input 64 of the hydraulically controllable pressure-limiting valve 63 is limited to the annular chamber pressure prevailing upstream of the pressure-limiting valve 63 in the first pressure-limiting line 61. If the control pressure exceeds the annular chamber pressure prevailing in the first pressure-limiting line 61, the hydraulically controllable pressure-limiting valve 63 acts as a conventional pressure-limiting valve, both the pressure to be limited and also the control pressure applied to the control input 64 working against the spring of the first pressure-limiting valve 63.

In the control arrangement 82 illustrated in FIG. 2, the annular chamber pressure $p_R$ likewise exhibits the progression in dependence on the piston chamber pressure $p_K$ as illustrated in FIG. 3. Again, in regions in which the piston chamber pressure $p_K$ is greater than the piston chamber pressure limit $p_G$, the annular chamber pressure assumes a constant value, whereas the farther the piston chamber pressure $p_K$ falls below the piston chamber pressure limit $p_G$, the higher the values assumed by the annular chamber pressure. Also, when using the control arrangement 82, the spring rate $c_A$ of the hydropneumatic suspension system shows the progression in dependence on the axle load $F_A$ as schematically illustrated in FIG. 4. At low axle loads $F_A$, the spring rate $c_A$ increases. As already mentioned, this counteracts pitching oscillations about the transverse tractor axle when heavy attachments are used at the rear of the tractor.

The invention claimed is:

1. A control arrangement for a hydropneumatic suspension system, the control arrangement comprising:
   a pressure supply connection for connecting to a pressure supply,
   a return connection,
   a piston chamber connection adapted to be connected to a piston chamber of a suspension cylinder of the hydropneumatic suspension system and adapted to be acted upon by a piston chamber pressure,
   an annular chamber connection adapted to be connected to an annular chamber of the suspension cylinder of the hydropneumatic suspension system and adapted to be acted upon by an annular chamber pressure,
   at least one controllable valve arrangement that comprises a plurality of switch positions via which the pressure supply connection and the return connection are connectable to the piston chamber connection and the annular chamber connection,
   the annular chamber connection being in flow connection with the return connection via a first pressure-limiting line, and
   a hydraulically controllable pressure-limiting element provided in the first pressure-limiting line, said pressure-limiting element having a control input adapted to be acted upon via a control line by a control pressure that corresponds to the piston chamber pressure,
   wherein:
      the control pressure is limitable to a predefinable pressure limit, and
      the at least one controllable valve arrangement is in flow connection with the piston chamber connection via a first output line and in flow connection with the annular chamber connection via a second output line.

2. The control arrangement according to claim 1, wherein the pressure-limiting element is configured as one of a hydraulically controllable pressure-limiting valve or as a hydraulically controllable pressure control valve.

3. The control arrangement according to claim 1, wherein the piston chamber connection is in flow connection with the control input of the hydraulically controllable pressure-limiting element via the control line, a flow rate of the hydraulic fluid flowing through the control line being limitable.

4. The control arrangement according to claim 1, wherein a throttle element is provided in the control line.

5. The control arrangement according to claim 1, wherein the control line is in flow connection with the return connection via a second pressure-limiting line, a further pressure-limiting element being provided in the second pressure-limiting line.

6. The control arrangement according to claim 5, wherein the further pressure-limiting element is configured as a pressure-limiting valve.

7. The control arrangement according to claim 5, wherein an opening pressure of the further pressure-limiting element is adjustable.

8. The control arrangement according to claim 1, wherein the control line is in flow connection with the first pressure-limiting line via a connecting line, the connecting line ending in the first pressure-limiting line on a high pressure side of the hydraulically controllable pressure-limiting element.

9. The control arrangement according to claim 8, wherein a check valve that opens in a direction toward the first pressure-limiting line is provided in the connecting line.

10. A hydropneumatic suspension system, comprising:
    a pump for pressure generation,
    a reservoir for hydraulic fluid, and
    at least one suspension cylinder that has a piston chamber which carries a suspension load, and which is acted upon by a piston chamber pressure and is connected to a first hydraulic accumulator,
    an annular chamber that sealingly surrounds a piston rod of the at least one suspension cylinder, which is acted upon by an annular chamber pressure and is connected to a second hydraulic accumulator, and
    a control arrangement, the control arrangement comprising:
       a pressure supply connection for connecting to a pressure supply,
       a return connection,
       a piston chamber connection adapted to be connected to the piston chamber of the at least one suspension cylinder and adapted to be acted upon by the piston chamber pressure,
       an annular chamber connection adapted to be connected to the annular chamber of the at least one suspension cylinder and adapted to be acted upon by the annular chamber pressure,
       at least one controllable valve arrangement that comprises a plurality of switch positions via which the pressure supply connection and the return connection are connectable to the piston chamber connection and the annular chamber connection,
       the annular chamber connection being in flow connection with the return connection via a first pressure-limiting line, and
       a hydraulically controllable pressure-limiting element provided in the first pressure-limiting line, said pressure-limiting element having a control input adapted to be acted upon via a control line by a control pressure that corresponds to the piston chamber pressure,
       wherein:
          the control pressure is limitable to a predefinable pressure limit,
          the piston chamber being in flow connection with the piston chamber connection, and the annular chamber being in flow connection with the annular chamber connection, and the at least one controllable valve arrangement is in flow connection with the piston chamber connection via a first output line and in flow connection with the annular chamber connection via a second output line.

* * * * *